United States Patent [19]
Lowery

[11] Patent Number: 5,199,204
[45] Date of Patent: Apr. 6, 1993

[54] TURKEY DECOY KIT APPARATUS

[76] Inventor: Lester L. Lowery, Rte. 1, Box 13, Virgilina, Va. 24598

[21] Appl. No.: 846,038

[22] Filed: Mar. 5, 1992

[51] Int. Cl.$^5$ ............................................. A01M 31/06
[52] U.S. Cl. ................................................. 43/2; 43/3
[58] Field of Search ..................................... 43/2, 1, 3

[56] References Cited
U.S. PATENT DOCUMENTS

| | | | |
|---|---|---|---|
| 2,525,120 | 10/1950 | Ernst | 43/3 |
| 2,816,384 | 12/1957 | Rexius | 43/3 |
| 4,658,530 | 4/1987 | Ladehoff | 43/3 |
| 4,773,178 | 9/1988 | Marek | 43/2 |
| 4,885,861 | 12/1989 | Gazalski | 43/3 |
| 4,965,953 | 10/1990 | McKinney | 43/2 |

*Primary Examiner*—Richard K. Seidel
*Attorney, Agent, or Firm*—Leon Gilden

[57] ABSTRACT

A turkey kit assemblage includes a turkey representative figure, including a torso, a tail portion, upwardly and forwardly extending neck and head portion, with simulated wings mounted to the torso. The torso includes a body mount member mounted to a bottom surface of the torso arranged for accommodating various securement members, to include leg members to include spikes, a spring-biased clamp structure, a unitary spike assemblage and the like for mounting to various surfaces and objects. The invention is further arranged to include an elongate malleable spine member directed coextensively from the head through the tail portion of the decoy, and is further arranged to accommodate a scent distribution assemblage for distribution of a scent relative to the torso of the structure.

5 Claims, 6 Drawing Sheets

TURKEY DECOY KIT APPARATUS

BACKGROUND OF THE INVENTION

1. Field of the Invention

The field of invention relates to decoy apparatus, and more particularly pertains to a new and improved turkey decoy kit apparatus wherein the same is arranged to simulate a turkey member and effect attracting similar animals thereto.

2. Description of the Prior Art

Turkey decoy structure of various types are utilized throughout the prior art in an effort to attract and draw like game relative to the decoy structure. Such apparatus is exemplified in U.S. Pat. No. 4,965,953 to McInney setting forth a remote controlled decoy structure.

U.S. Pat. No. 4,590,699 to Nicks sets forth a foldable decoy member arranged in a fan-like construction.

U.S. Pat. No. 4,852,288 to Payne, et al. sets forth an articulated decoy member utilizing movable head and tail portions relative to a central torso pivotally mounted to the central torso portion.

U.S. Pat. No. 4,890,408 to Heiges, et al. sets forth a water fowl decoy of a duck-like configuration, including means for mounting an anchor line thereto.

As such, it may be appreciated that there continues to be a need for a new and improved turkey decoy kit apparatus as set forth by the instant invention which addresses both the problems of ease of use as well as effectiveness in construction and in this respect, the present invention substantially fulfills this need.

SUMMARY OF THE INVENTION

In view of the foregoing disadvantages inherent in the known types of decoy apparatus now present in the prior art, the present invention provides a turkey decoy kit apparatus wherein the same is arranged to set forth a simulated turkey member, including variously mounted structure for securement of the decoy structure to various support surfaces. As such, the general purpose of the present invention, which will be described subsequently in greater detail, is to provide a new and improved turkey decoy kit apparatus which has all the advantages of the prior art decoy apparatus and none of the disadvantages.

To attain this, the present invention provides a turkey kit assemblage including a turkey representative figure, including a torso, a tail portion, upwardly and forwardly extending neck and head portion, with simulated wings mounted to the torso. The torso includes a body mount member mounted to a bottom surface of the torso arranged for accommodating various securement members, to include leg members to include spikes, a spring-biased clamp structure, a unitary spike assemblage and the like for mounting to various surfaces and objects. The invention is further arranged to include an elongate malleable spine member directed coextensively from the head through the tail portion of the decoy, and is further arranged to accommodate a scent distribution assemblage for distribution of a scent relative to the torso of the structure.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measureed by the claims, nor is it intended to be limiting as to the scope of the invention in any way.

It is therefore an object of the present invention to provide a new and improved turkey decoy kit apparatus which has all the advantages of the prior art decoy apparatus and none of the disadvantages.

It is another object of the present invention to provide a new and improved turkey decoy kit apparatus which may be easily and efficiently manufactured and marketed.

It is a further object of the present invention to provide a new and improved turkey decoy kit apparatus which is of a durable and reliable construction.

An even further object of the present invention is to provide a new and improved turkey decoy kit apparatus which is susceptible of a low cost of manufacture with regard to both materials and labor, and which accordingly is then susceptible of low prices of sale to the consuming public, thereby making such decoy apparatus economically available to the buying public.

Still yet another object of the present invention is to provide a new and improved turkey decoy kit apparatus which provides in the apparatuses and methods of the prior art some of the advantages thereof, while simultaneously overcoming some of the disadvantages normally associated therewith.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
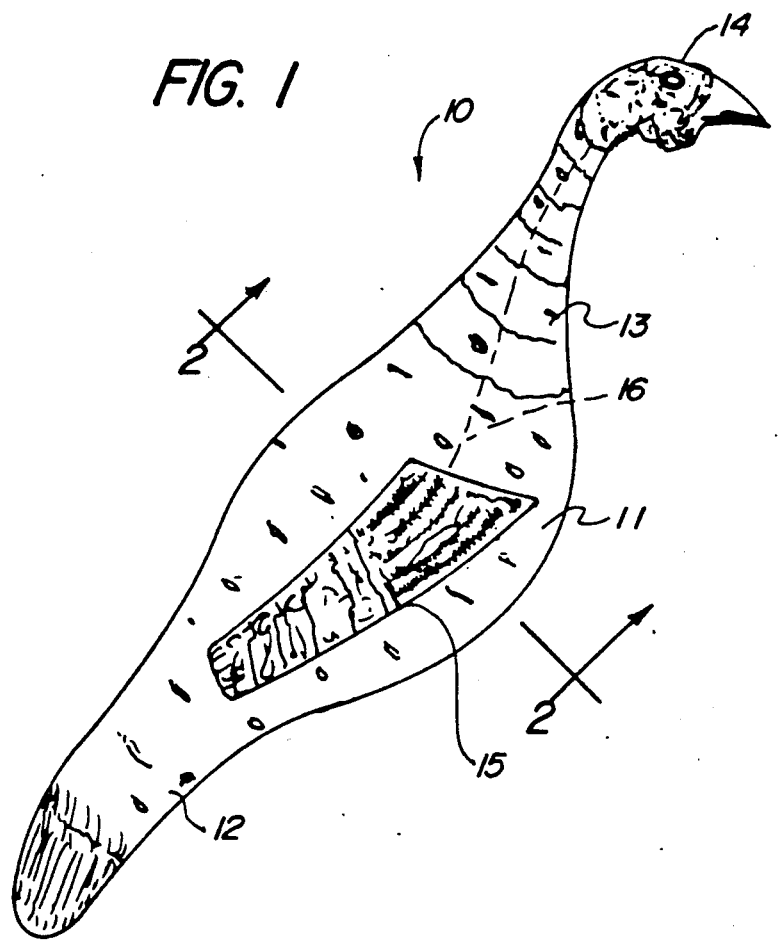
FIG. 1 is an isometric illustration of the instant invention.

With reference now to the drawings, and in particular to FIGS. 1 to 12 thereof, a new and improved turkey decoy kit apparatus embodying the principles and concepts of the present invention and generally designated by the reference numerals 10 and 10a will be described.

More specifically, the turkey decoy kit apparatus 10 of the instant invention essentially comprises a central body torso 11 formed with a tail portion 12 extending from a rear portion of the central body torso, with a neck portion 13 extending from a forward end of the torso 11 terminating in a head 14. The neck portion 13 and the tail portion 12 are substantially aligned relative to one another at opposed ends of the torso. Wing members 15 are mounted to opposed sides of the torso, in a manner as illustrated in FIG. 1.

A deformable spine rod 16 extends coextensively from and including the tail portion 12 through the neck portion 13 into the head 14. The spine rod 16 in this manner permits displacement of the tail, head, and neck portions relative to the torso to accommodate various positions of the decoy, to include feeding, standing, and the like.

Figure 2:
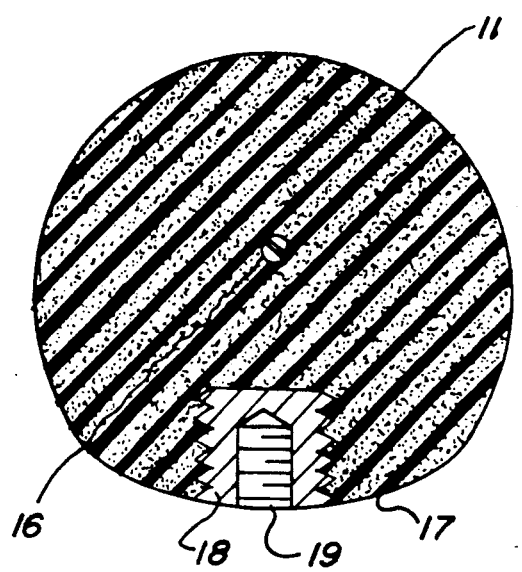
FIG. 2 is an orthographic view, taken along the lines 2—2 of FIG. 1 in the direction indicated by the arrows.
Figure 3:
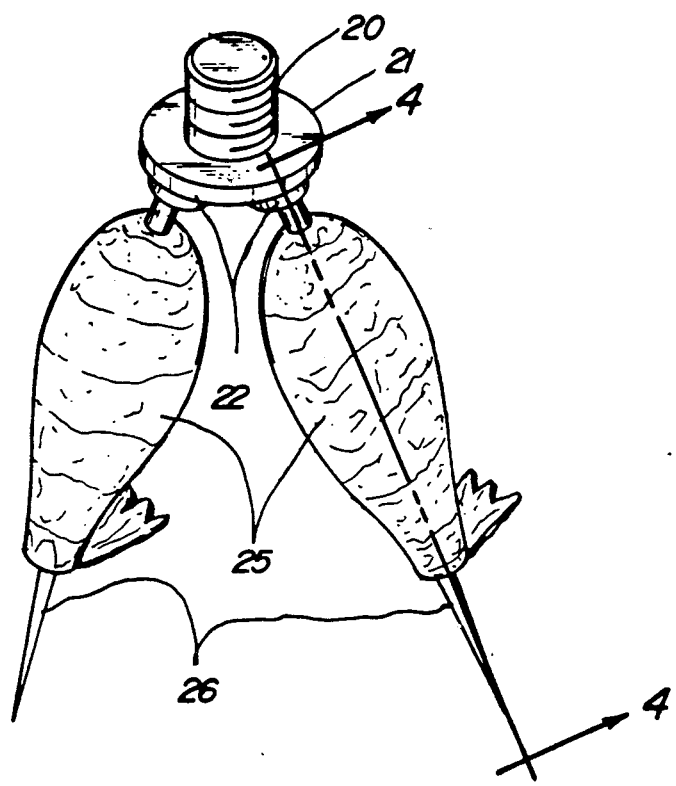
FIG. 3 is an isometric illustration of the leg member structure utilized by the invention.
Figure 4:
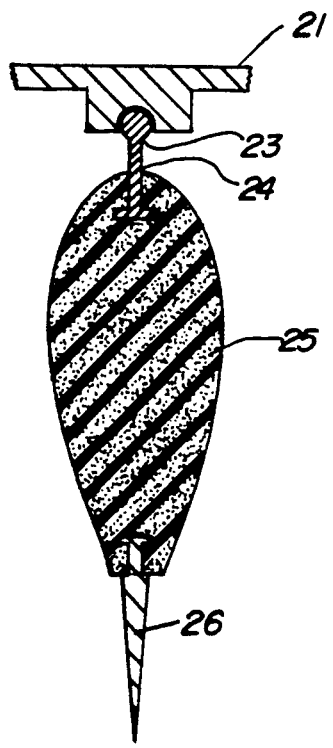
FIG. 4 is an orthographic view, taken along the lines 4—4 of FIG. 3 in the direction indicated by the arrows.

The torso 11 further is formed with a torso body surface 17, with a support block 18 projecting into the torso from the bottom surface 17. The support block 18 includes an internally threaded bore 19, of a manner as illustrated in FIG. 2. A first threaded boss 20 is arranged for selective reception within the threaded bore 19, formed with a first boss plate 21. The first boss plate 21 includes a plurality of leg mounts 22 diametrically mounted to opposed end portions of the bottom surface of the first boss plate 21, wherein each of the leg mounts 22 includes a swivel joint 23. The swivel joints each include a joint rib 24 extending into a polymeric leg member 25. Each polymeric leg member 25 includes a spike projection 26 longitudinally aligned rerlative to the leg member 25 and the joint rib 24. Each spike projection 26 as illustrated projects exteriorly of each leg member 25 through a lowermost end portion thereof.

Figure 5:
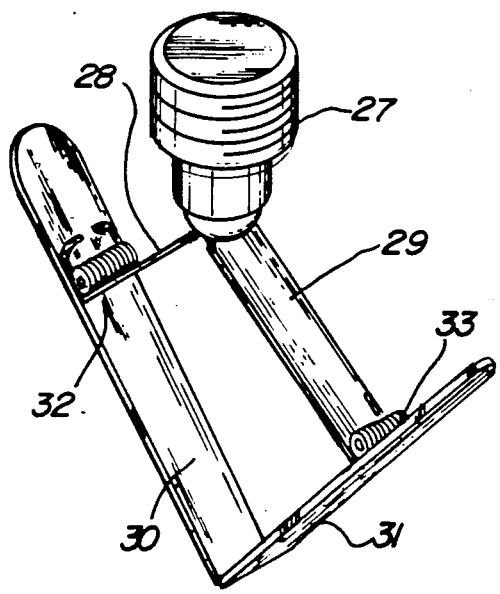
FIG. 5 is an isometric illustration of the clamp structure utilized by the kit organization of the invention.
Figure 6:
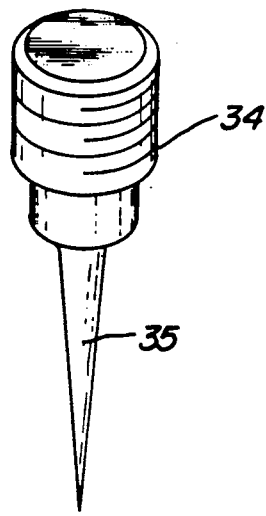
FIG. 6 is an isometric illustration of the spike support assemblage utilized by the invention.

The FIG. 5 illustrates the use of a second threaded boss 27 fixedly mounting a first and second plate 28 and 29 thereto, wherein the first and second plates 28 and 29 are oriented relative to one another at an oblique included angle. Respective third plate 30 and a fourth plate 31 are hingedly mounted to the respective first and second plates 28 and 29 about respective first and second spring hinges 32 and 33 that bias the lower distal ends of third and fourth plates 30 and 31 into engagement relative to one another to permit clamping of the organization relative to a support member (not shown).

A third threaded boss 34 includes a unitary boss spike 35 projecting downwardly therefrom that is coaxially aligned with the threaded boss 34 for projection of the member into an underlying support not accommodating the width of the first threaded boss plate 21 and the associated leg members.

Figure 7:
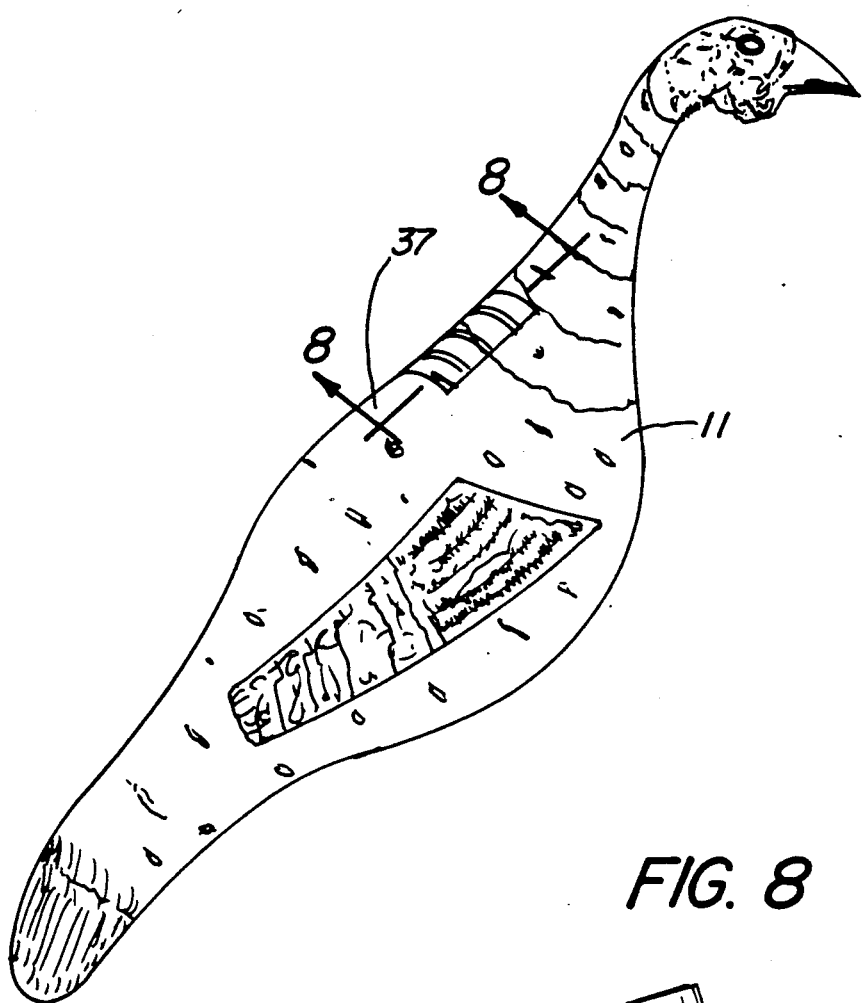
FIG. 7 is an isometric illustration of the torso portion, including a scent distribution chamber.
Figure 8:
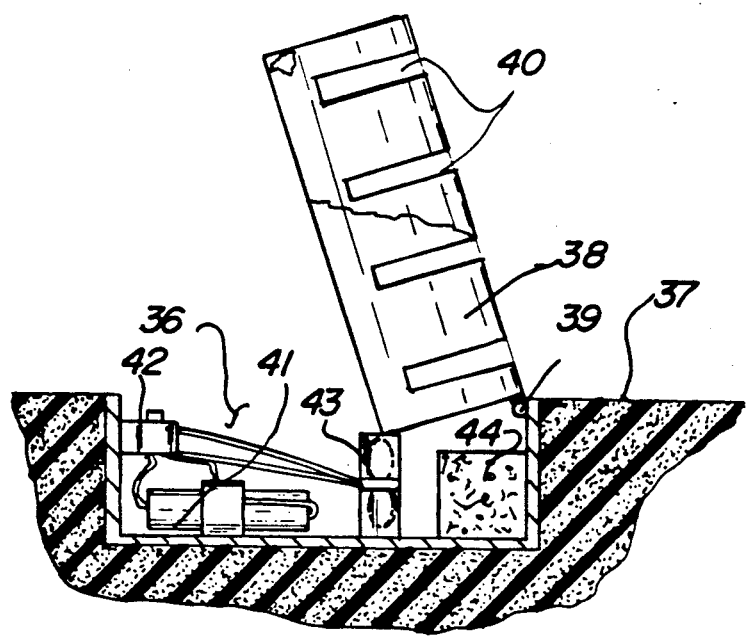
FIG. 8 is an orthographic view, taken along the lines 8—8 of FIG. 7 in the direction indicated by the arrows.
Figure 9:
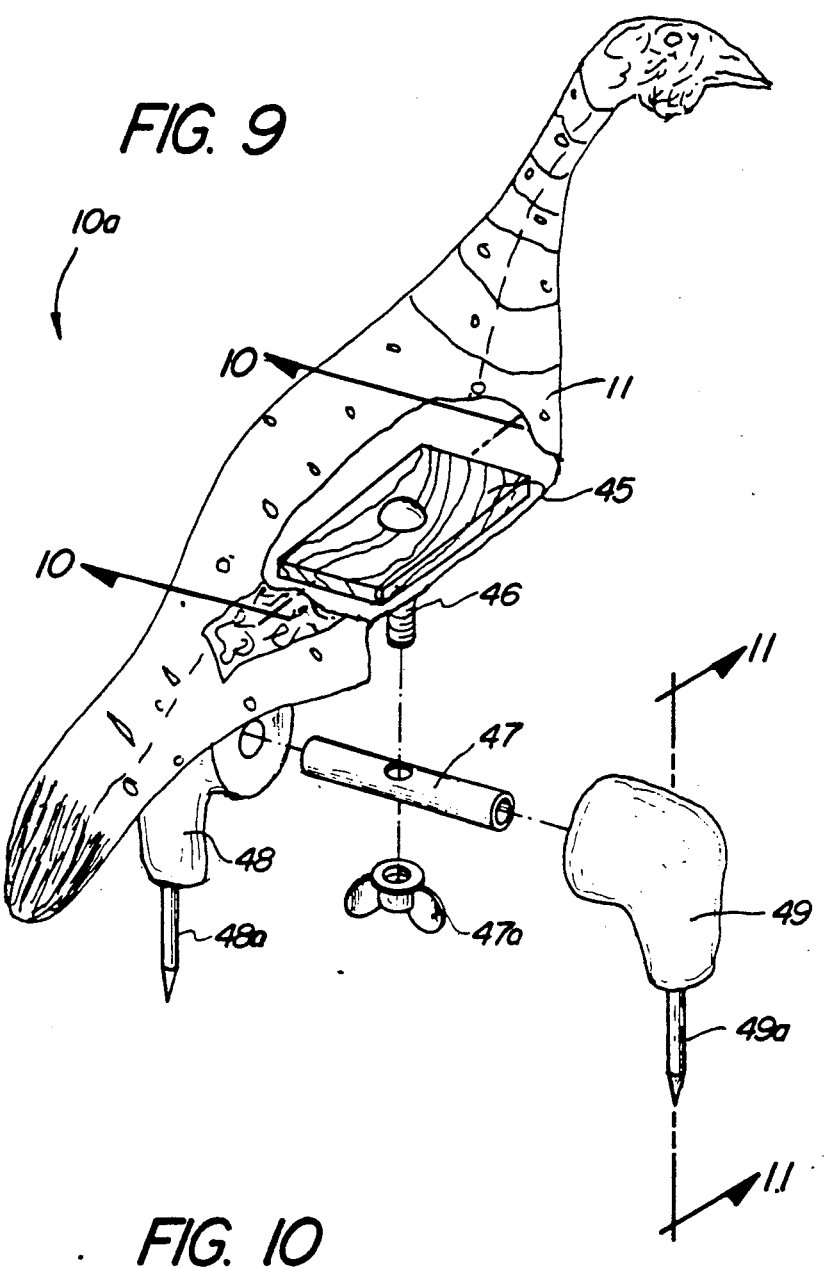
FIG. 9 is an isometric illustration of a modified body structure utilized by the invention.
Figure 10:
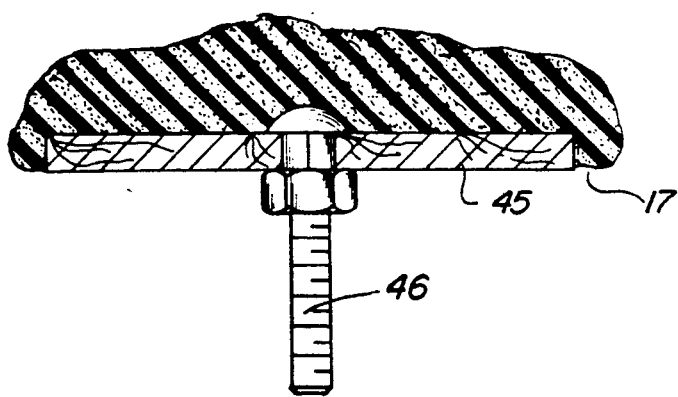
FIG. 10 is an orthographic view, taken along the lines 10—10 of FIG. 9 in the direction indicated by the arrows.

The FIG. 7 illustrates the torso 11 arranged to optionally include a torso cavity 36 directed through a torso top surface 37 thereof, with a cavity door 38 arranged in aligned relationship relative to the outer surface of the torso 11. The cavity door 38 includes a door hinge 39 hingedly mounting the cavity door 38 to the torso cavity 36. The cavity door 38 further is formed with a plurality of spaced slots 40 to permit distribution of a game attracting scent from within the torso cavity 36. A battery 41 and an on/off switch 42 is arranged in electrical communication with a blower motor 43. The blower motor 43 mounted to a floor of the torso cavity 36 is positioned in adjacency to a fluid absorbent block 44 that includes a fluid scent impregnated within the block 44, whereupon actuation of the blower motor 43 effects distribution of the scent through the slots 40.

Figure 11:
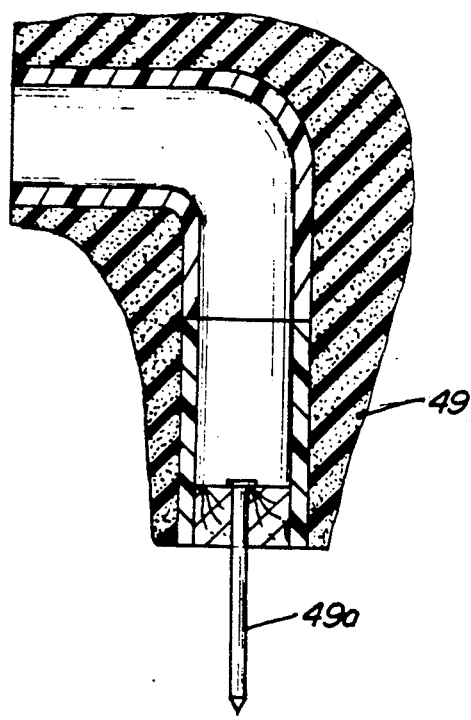
FIG. 11 is an orthographic view, taken along the lines 11—11 of FIG. 9 in the direction indicated by the arrows.

The FIGS. 9-12 illustrate a modified apparatus 10a to set forth a mounting plate 45 positioned within the torso 11 adjacent the bottom surface 17, and is arranged with a mounting plate threaded rod 46 extending orthogonally and downwardly relative to the mounting plate 45 arranged for reception of a support tube 47 medially of the support tube, wherein the support tube 47 includes first and second leg members 48 and 49 mounted to opposed ends of the support tube. The leg members each include a first and second respective spike 48a and 49a projecting downwardly relative to each leg member for securement to an underlying support surface. Further, each leg member includes a tubular cavity arranged for reception of the support tube 47 therewithin for mounting the legs to the support tube 47, as illustrated in FIG. 11 and the FIG. 9.

Figure 12:
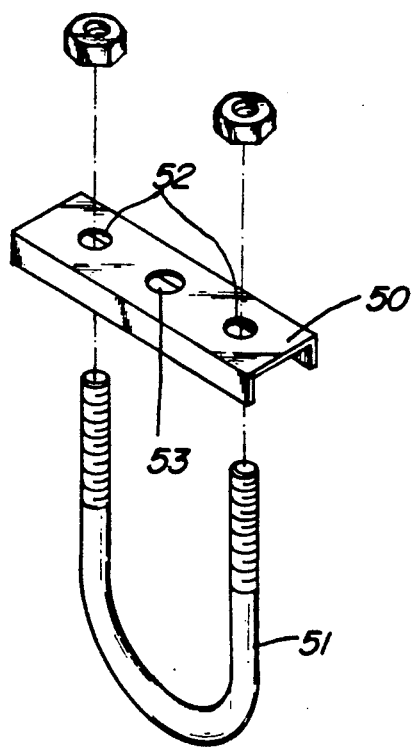
FIG. 12 is an isometric illustration of a further clamp structure utilized by the invention, as set forth in FIG. 9.

The FIG. 12 illustrates a mounting plate 50 arranged for securement to the mounting plate threaded rod 46, wherein the mounting plate 50 includes a plurality of mounting plate outer bores 52 arranged for reception of the legs of a U-shaped fastener 51 therethrough. A mounting plate central bore 53 is arranged for reception of the mounting plate threaded rod 46, as well as associated fasteners 47a, as illustrated in the FIG. 9, for securement of the support tube 47, or alternatively of the mounting of the clamp plate 50 to the mounting plate threaded rod 46.

As to the manner of usage and operation of the instant invention, the same should be apparent from the above disclosure, and accordingly no further discussion relative to the manner of ussage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A turkey decoy kit apparatus, comprising, an elongate central body torso, the body torso including a torso rear end portion and a torso forward end portion, the rear end portion and the forward end portion are longitudinally aligned relative to one another, and the rear end portion including a tail portion projecting exteriorly of the central body torso, and a neck portion mounted to the forward end portion extending exteriorly of the central body torso, the neck portion including a head portion mounted to the neck portion spaced from the central body torso, and a plurality of wing members mounted to the central body torso, and a deformable spine rod mounted coextensively through the tail portion, the central body torso, the neck portion, and the head portion, and the central body torso including a torso bottom surface and a torso top surface, the torso bottom surface including a rigid support block mounted within the torso through the torso bottom surface, with the support block including a threaded bore directed therewithin, and mounting means secured to the threaded bore for securement of the torso to a support surface.

2. An apparatus as set forth in claim 1 wherein the mounting means includes a threaded boss threadedly received within the threaded bore, the threaded boss including a boss plate, the boss plate including a plurality of leg mounts mounted to a plate bottom surface of the boss plate, wherein the leg mounts are diametrically aligned relative to one another and fixedly secured to the boss plate, and each leg mount includes a polymeric leg member mounted thereto, wherein each polymeric leg member includes a swivel joint connection between one of said polymeric leg members to one of said leg mounts, and each leg member includes a spike projection projecting exteriorly thereof, wherein each spike projection is coaxially aligned with one of the polymeric leg members and one of the swivel joints, and each swivel joint includes rib extending from said one of said swivel joints into an associated one of said polymeric leg members.

3. An apparatus as set forth in claim 1 wherein said mounting means includes a threaded boss, the threaded boss includes a first plate and a second plate fixedly mounted to the threaded boss, wherein the first plate and the second plate include a first plate first distal end and a second plate first distal end, wherein the first plate first distal end and the second plate first distal end are fixedly secured to the threaded boss, and the first plate and the second plate define an oblique angle therebetween, and a third plate pivotally mounted to the first plate, and a fourth plate pivotally mounted to the second plate, and a first spring hinge connection between the first plate and the third plate, and a second spring hinge connection between the second plate and the fourth plate, wherein the third plate includes a third plate lower distal end and the fourth plate includes a fourth plate lower distal end, wherein the third plate lower distal end and the fourth plate lower distal end are arranged in biased contiguous communication relative to one another.

4. An apparatus as set forth in claim 1 wherein the mounting means includes a threaded boss, the threaded boss includes a unitary boss spike coaxially aligned with the threaded boss projecting downwardly therefrom.

5. An apparatus as set forth in claim 1 wherein the central body torso includes a torso cavity, the torso cavity includes a cavity door, the cavity door including a cavity door hinge, the cavity door hinge hingedly mounted within the torso cavity, and the cavity door including a plurality of spaced slots directed therethrough in communication with the torso cavity, and the torso cavity mounting a battery, an on/off switch, and a blower motor within the cavity, with the blower motor mounted to a torso cavity floor of the torso cavity, and a fluid absorbent block mounted to the torso cavity floor, the fluid absorbent block arranged in adjacency relative to the blower motor, the fluid absorbent block including a fluid scent impregnated therewithin, whereupon actuation of the blower motor effects distribution of said fluid scent exteriorly of the torso cavity through the slots.

* * * * *